Oct. 22, 1935.  H. H. WEBB  2,018,538
LIQUID MEASURING APPARATUS
Filed Nov. 20, 1933
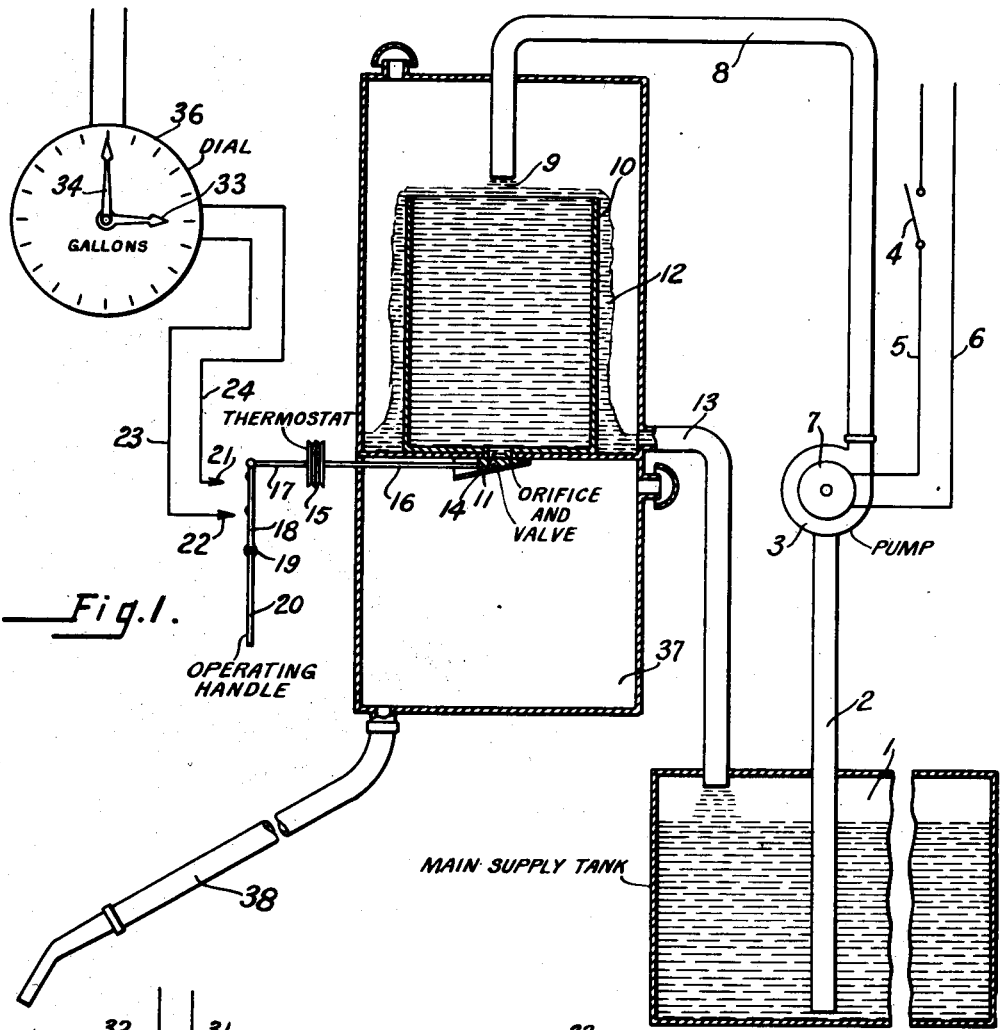
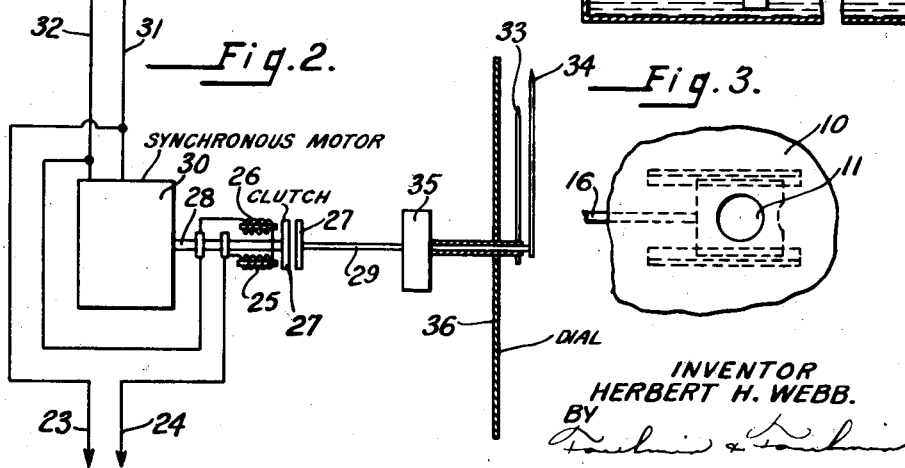
INVENTOR
HERBERT H. WEBB.
BY
ATTORNEYS Patented Oct. 22, 1935

2,018,538

UNITED STATES PATENT OFFICE 2,018,538

LIQUID MEASURING APPARATUS

Herbert H. Webb, Dayton, Ohio

Application November 20, 1933, Serial No. 698,748

3 Claims. (Cl. 73—167)

My invention relates to a liquid measuring apparatus.

It is the object of my invention to provide means of measuring an amount of liquid according to the rate of flow through an orifice of given diameter; and to indicate in liquid quantity the amount of liquid so flowing in a given interval of time by using a time instrument for that purpose.

It is my object, therefore, to provide the liquid quantity indicating mechanism of such a character that it will not be influenced by the liquid flowing mechanism and it will, therefore, be accurate. For instance, I provide a synchronous electric motor for operating the hands indicating the number of gallons to be dispensed and connect those hands to the synchronous electric motor during the period that the liquid is flowing so that the interval of time will be indicated by the synchronous electric motor through the clock hands and the expression will be in the terms of gallons. The hands will be connected, according to my invention, to the electric motor upon the opening of the orifice through which the fluid will flow at a constant rate.

It is a further object to provide for this flow always under constant pressure. The result is a constant flow, measured time fluid meter.

It is my object to provide means of thermostatically compensating for the size of the orifice according to temperature so that there will be a uniform ratio at all temperatures for the flow through the standard orifice so thermostatically adjusted.

It is my object to provide a meter for liquids employing the principle that the rate of flow of the liquid is constant for a given pressure: and means of maintaining substantially constant pressure and means of measuring the duration of flow as by an indicator driven by a synchronous electric clock with provision for both the flow of the liquid and the indicator being started and stopped simultaneously.

Referring to the drawing:

Figure 1 is a diagrammatic view partially in section showing the system;

Figure 2 indicates diagrammatically and partially in section the means of connecting the indicating hands to the synchronous electric motor;

Figure 3 indicates the compensatory shape of the valve which is thermostatically adjusted in connection with the difference in temperature of the liquid flowing through the orifice.

Referring to the drawing in detail, 1 is a main supply tank from which liquid is pumped through the pipe 2 through the agency of the pump 3. This pump is started by closing the switch 4 and thereby connects through the power lines 5 and 6 the motor 7 of the pump to a suitable source of electrical energy.

The pipe 8 is a discharge pipe from the pump and discharges the liquid at 9 into a tank 10. The rate of discharge is greater than the rate of flow through the bottom orifice 11 of the tank 10 so that the liquid as at 12 overflows in order to maintain a constant level and a constant pressure in the tank 10.

This liquid that overflows passes back through the pipe 13 to the main supply tank 1.

The bottom of the tank 10 is engaged by the sliding valve 14 controlling the orifice 11. As this orifice is of constant size and the liquid is under constant pressure, there will be a constant flow therethrough for a given interval of time. Any variations in this rate of flow due to temperature variations will be accommodated by the adjustment of the position of the valve relative to its actuating mechanism by a thermostat 15. The thermostat operates to regulate the extent of the orifice and thereby prevent any increase in the flow of fluid due to any diminution of its viscosity because of rise in temperature. A decrease in viscosity increases the flowing qualities of the fluid, and to prevent any increase in flow a thermostat is provided. This thermostat is located between the actuating rods 16 and 17 for the valve 14. The rod 17 is connected to the lever 18 pivoted at 19 and having a handle 20. When the valve is opened by operating the handle 20 and moving it towards the right hand side, the lever 18 bridges the terminals 21 and 22 of the lines 23 and 24 thereby permitting the energization of the solenoid coils 25 and 26 to actuate the clutch faces 27 to join the clock shaft 28 and hand shaft 29. This causes the hand shaft and clock shaft to turn together as actuated by the synchronous electric clock 30 supplied by the power lines 31 and 32.

The hands 33 and 34 are operated together in synchronism from the shaft 29 through the gear box 35 in any conventional manner. The details of this arrangement do not form any part of my invention.

The liquid thus discharged through the orifice 11 is measured in terms of gallons by hands which operate in terms of time and, as the time of flow of a given quantity of liquid through the standard orifice under a standard pressure at a given temperature is constant, the indication will be accurate on the face of the indicating dial 36.

The flow of the liquid and the indicating mechanism operate simultaneously and are controlled by the common handle 20 and they operate in synchronism with one another. The liquid discharges into the tank 37 and thence through the hose 38 into an automobile or similar piece of mechanism.

It will be noted that there can be no relative slip as to indication of quantity between the liquid flowing mechanism and the indicating mechanism. The liquid flow mechanism is supplied with constant pressure from the pump 3 and the indicating mechanism is supplied with electric current that is synchronized at the power house and thereby provides constant speed through the synchronous motor 30. The slip that is found in such measuring apparatus in connection with liquid meters is entirely absent. It is likewise an improvement over the use of a pump as a meter or similar mechanism.

By my invention I completely divorce the accuracy of the measuring instrument from the liquid handling instrumentalities and, therefore, accomplish an accuracy which is vital in liquid measuring apparatus which has not hitherto been possible.

I operate the clock continuously so that there is no starting and stopping lag, and only connect the hands of the clock when the valve is open so that there will be instantaneous connection upon the immediate opening and closing of the valve 14. This eliminates the wastage of liquid, inaccuracy in registration and lag in registration which was characteristic of liquid measuring mechanisms in the past.

It will be understood that I desire to comprehend within my invention such modifications as may be necessary to adapt it to varying conditions and uses.

Having thus fully described my invention, what I claim as new and desire to secure by Letters Patent, is:

1. In combination, a measuring tank having a discharge orifice, opening and closing means for the orifice, means of maintaining liquid in said tank at a constant level, means of indicating by a time mechanism the quantity of liquid passing through the orifice in a given period of time, means for causing the time indicating mechanism to operate upon opening the orifice in the tank, and means of thermostatically adjusting the relative position of the opening and closing means for the orifice in the tank according to temperature.

2. In combination, a supply tank, a pump for removing liquid therefrom, an overflow measuring tank receiving liquid from said pump and having a bottom orifice, an overflow enclosure for receiving said overflow and returning it to the supply tank, means of returning the overflow to the supply tank, a valve controlling said orifice, means for actuating said valve having a thermostatic element therein, a synchronous motor having indicating hands and a dial, a circuit adapted to be controlled by the means actuating said valve for connecting said indicating hands to said synchronous motor whereby when the valve is open the hands will operate in an interval of time and indicate the quantity flowing through the orifice.

3. In combination, a measuring tank having a discharge orifice, opening and closing means for the orifice, means of maintaining liquid in said tank at a constant level, means of indicating by a time mechanism the quantity of liquid passing through the orifice in a given period of time, means for causing the time indicating mechanism to operate upon opening the orifice in the tank, and means of adjusting the relative position of the opening and closing means for the orifice in the tank according to temperature.

HERBERT H. WEBB.